United States Patent
Sevindik

(10) Patent No.: US 11,647,420 B2
(45) Date of Patent: May 9, 2023

(54) DOWNLINK AND UPLINK DATA HANDLING IN A WIRELESS DEVICE

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 154 days.

(21) Appl. No.: 17/178,565

(22) Filed: Feb. 18, 2021

(65) Prior Publication Data

US 2022/0264362 A1 Aug. 18, 2022

(51) Int. Cl.
*H04W 28/02* (2009.01)
*H04L 47/10* (2022.01)
*H04L 47/30* (2022.01)

(52) U.S. Cl.
CPC ......... *H04W 28/0278* (2013.01); *H04L 47/10* (2013.01); *H04L 47/30* (2013.01); *H04W 28/0221* (2013.01)

(58) Field of Classification Search
None
See application file for complete search history.

(56) References Cited

U.S. PATENT DOCUMENTS

| | | | |
|---|---|---|---|
| 9,788,263 B1* | 10/2017 | Amiri | H04W 88/085 |
| 2005/0044289 A1* | 2/2005 | Hendel | G06F 3/0676 |
| | | | 710/33 |
| 2009/0172684 A1* | 7/2009 | Hwang | G06F 1/329 |
| | | | 718/103 |
| 2011/0113093 A1* | 5/2011 | Ido | H04B 3/36 |
| | | | 709/204 |
| 2012/0082049 A1* | 4/2012 | Chen | H04W 24/10 |
| | | | 370/252 |
| 2017/0273100 A1* | 9/2017 | Huang | H04W 74/08 |
| 2018/0070383 A1* | 3/2018 | Fujishiro | H04W 74/004 |
| 2021/0227418 A1* | 7/2021 | Hwang | H04W 24/10 |
| 2021/0274380 A1* | 9/2021 | Balasubramanian | |
| | | | H04L 1/1642 |

* cited by examiner

*Primary Examiner* — Andre Tacdiran
(74) *Attorney, Agent, or Firm* — Mendelsohn Dunleavy, P.C.; Steve Mendelsohn

(57) ABSTRACT

In some embodiments, a wireless device (e.g., a cell phone) has a transceiver, a processor, and a memory. The processor store periodic downlink (DL) data received from the transceiver in a periodic DL buffer in the memory, aperiodic DL data received from the transceiver in an aperiodic DL buffer in the memory, periodic uplink (UL) data in a periodic UL buffer in the memory, and aperiodic UL data in an aperiodic UL buffer in the memory. The processor determines in what order to handle the stored data in the periodic and aperiodic DL and UL buffers and handles the stored data in the determined order.

32 Claims, 3 Drawing Sheets

DOWNLINK AND UPLINK DATA HANDLING IN A WIRELESS DEVICE

BACKGROUND

Field of the Disclosure

The present disclosure relates to wireless communications and, more specifically but not exclusively, to wireless devices, such as cell phones, used in wireless communication systems.

Description of the Related Art

This section introduces aspects that may help facilitate a better understanding of the disclosure. Accordingly, the statements of this section are to be read in this light and are not to be understood as admissions about what is prior art or what is not prior art.

FIG. 1 is a simplified block diagram of a conventional wireless device 100, such as a cell phone, for use in a conventional wireless communication system. As shown in FIG. 1, the wireless device 100 has a radio transceiver 110, a processor 120, and a memory 130 having two data buffers: a downlink (DL) buffer 132 and an uplink (UL) buffer 134.

In operation, the radio transceiver 110 converts wireless downlink signals received from a base station (not shown) of the communication system into corresponding downlink data that the processor 120 temporarily stores in the DL buffer 132. The processor 120 subsequently accesses the DL buffer 132 to sequentially process subsets of the stored downlink data. In addition, the processor 120 generates and temporarily stores uplink data in the UL buffer 134 and subsequently accesses the UL buffer 134 to sequentially forward subsets of the stored uplink data to the radio transceiver 110 for transmission of corresponding wireless uplink signals to the base station.

In order to avoid or at least minimize data loss, the processor 120 processes the stored downlink data fast enough to avoid the DL buffer 132 becoming too full, e.g., unable to store additional downlink data that has arrived. Similarly, the processor 120 forwards the stored uplink data to the radio transceiver 110 fast enough to avoid the UL buffer 134 becoming too full, e.g., unable to store additional uplink data that has been generated.

Although not explicitly shown in FIG. 1, the wireless device 100 also has a rechargeable battery that powers the electronic components in the device. It is a goal to ensure that operations are performed in the wireless device 100 in an efficient manner in order to extend the time between needed recharging sessions for the device's battery.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may be performed out of the order noted in the figures. For example, two figures shown in succession may in fact be executed substantially concurrently or may sometimes be executed in the reverse order, depending upon the functions/acts involved.

Figure 1:
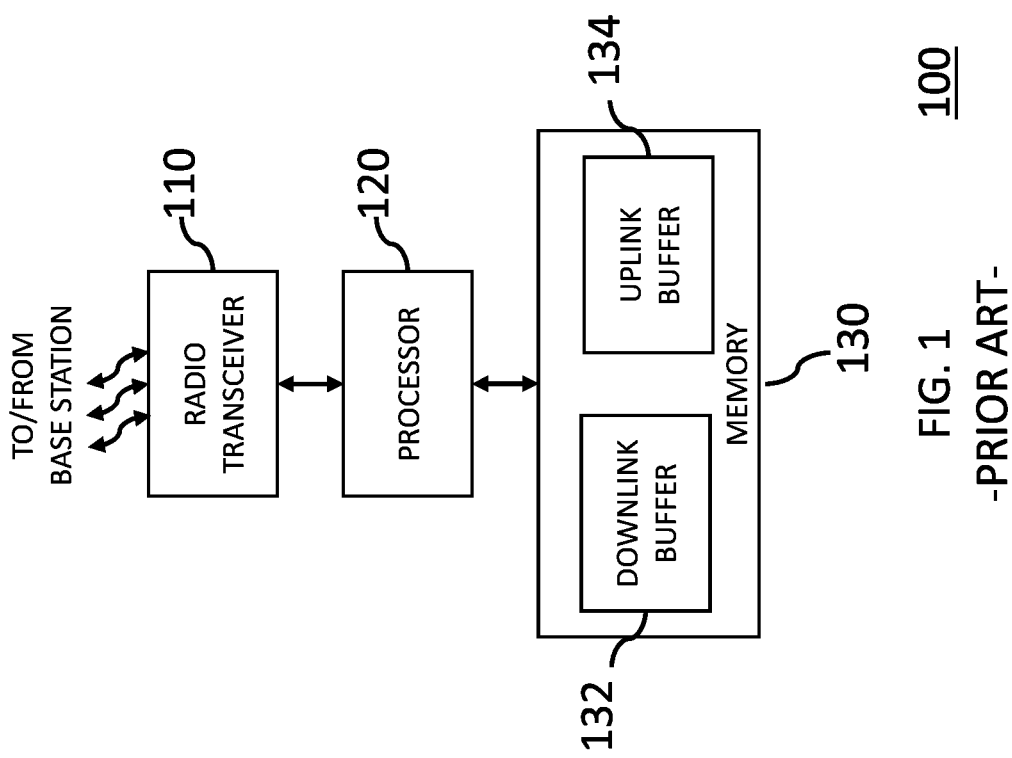
FIG. 1 is a simplified block diagram of a conventional wireless device, such as a cell phone.
Figure 2:
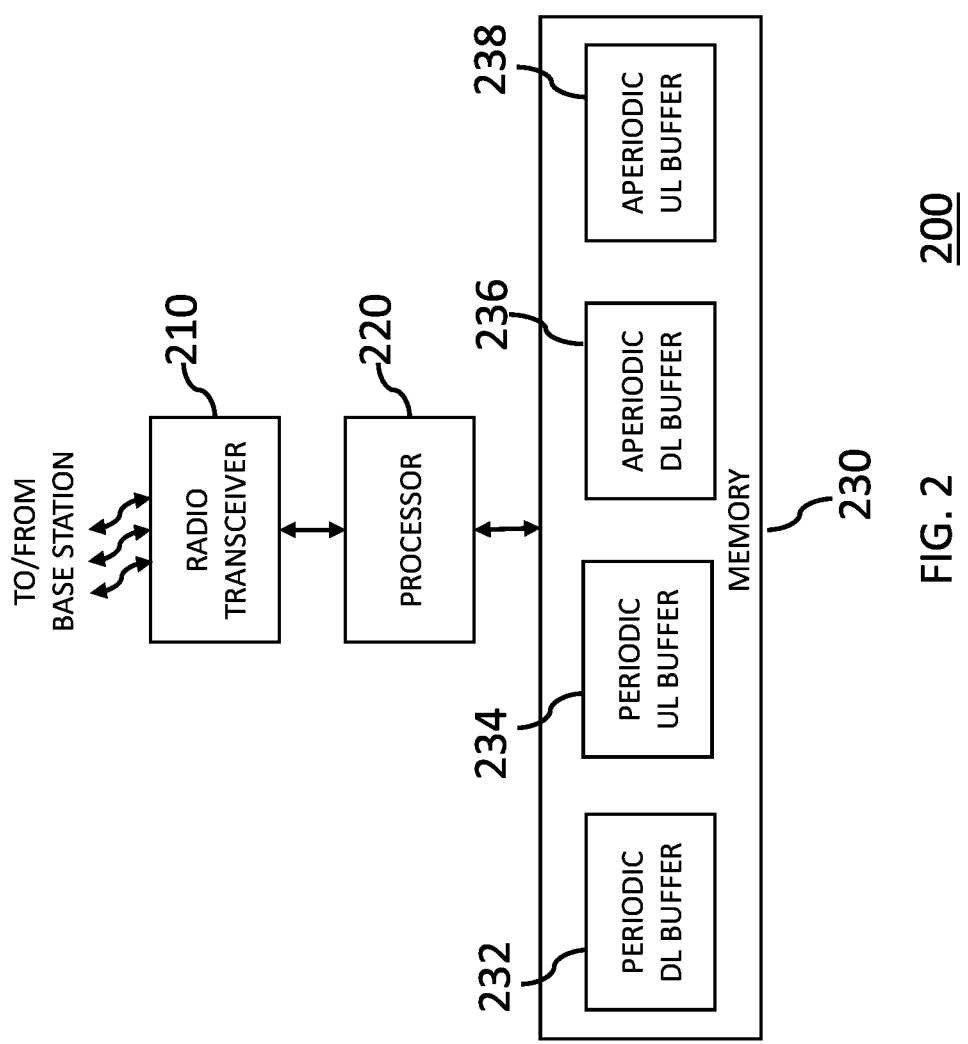
FIG. 2 is a simplified block diagram of a wireless device, such as a cell phone, according to an embodiment of the present disclosure.

FIG. 2 is a simplified block diagram of a wireless device 200, such as a cell phone, according to an embodiment of the present disclosure, for use in a wireless communication system. As shown in FIG. 2, the wireless device 200 has a radio transceiver 210, a processor 220, and a memory 230 having four data buffers: a periodic DL buffer 232, a periodic UL buffer 234, an aperiodic DL buffer 236, and an aperiodic UL buffer 238.

As used herein, the term "periodic" refers to data that is available at regular time intervals. For example, data associated with telephony and videoconferencing applications (apps) is periodic data because that data is available at regular time intervals, e.g., every 20 msec. Most periodic data is known as symmetric data because that data is generated by applications, such as telephony and videoconferencing apps, where the rate of downlink data is typically roughly equivalent to the rate of uplink data.

Furthermore, the term "aperiodic" refers to data that is not available at regular time intervals. For example, data associated with internet browsing and file transfers is typically aperiodic data because the data is not available at regular time intervals. Most aperiodic data is known as asymmetric data because that data is generated by applications, where the rate of downlink data is typically very different from (typically much greater than) the rate of uplink data.

Typically, the timing requirements for processing periodic data are more stringent than the timing requirements for processing aperiodic data. For example, for telephony, it is important that uplink data transmission and downlink data processing be performed at rates that are both sufficiently high and sufficiently steady to ensure that the corresponding telephony signals can be smoothly rendered at the respective receivers. On the other hand, the timing requirements for aperiodic data are typically less stringent.

Note that the terms "periodic" and "aperiodic" refer to the apps that generate and/or process data and to the corresponding data generated and/or processed by those apps; they do not refer to the operations of the buffers that store that data.

In other words, it's not that a periodic buffer operates periodically, while an aperiodic buffer operates aperiodically. Rather, a periodic buffer stores periodic data associated with a periodic app, and an aperiodic buffer stores aperiodic data associated with an aperiodic app.

In operation, the radio transceiver 210 converts wireless periodic DL signals received from a base station (not shown) of the communication system into periodic DL data that the processor 220 temporarily stores in the periodic DL buffer 232, where the processor 220 subsequently accesses the periodic DL buffer 232 to sequentially process subsets of the stored periodic DL data. In addition, the processor 220 generates and temporarily stores periodic UL data in the periodic UL buffer 234 and subsequently accesses the periodic UL buffer 234 to sequentially forward subsets of the stored periodic UL data to the radio transceiver 210 for transmission to the base station of corresponding wireless periodic UL signals.

Analogously, the radio transceiver 210 converts wireless aperiodic DL signals received from the base station into aperiodic DL data that the processor 220 temporarily stores in the aperiodic DL buffer 236, where the processor 220 subsequently accesses the aperiodic DL buffer 236 to sequentially process subsets of the stored aperiodic DL data. In addition, the processor 220 generates and temporarily stores aperiodic UL data in the aperiodic UL buffer 238 and subsequently accesses the aperiodic UL buffer 238 to sequentially forward subsets of the stored aperiodic UL data to the radio transceiver 210 for transmission to the base station of corresponding wireless aperiodic UL signals.

In order to avoid data loss, the processor 220 processes the stored periodic and aperiodic DL data fast enough to avoid the periodic and aperiodic DL buffers 232 and 236 becoming too full to store respective additional DL data that has arrived. Similarly, the processor 220 forwards the stored periodic and aperiodic UL data fast enough to avoid the periodic and aperiodic UL buffers 234 and 238 becoming too full to store respective additional UL data that has been generated.

Although not explicitly shown in FIG. 2, the wireless device 200 also has a rechargeable battery that powers the electronic components in the device. It is a goal to ensure that operations are performed in the wireless device 200 in an efficient manner in order to extend the time between needed recharging sessions for the device's battery. Operations that use significant amounts of battery power include decoding of downlink data and encoding and modulation of uplink data. Furthermore, when the wireless device 200 is at or near the outer limit of coverage by a base station, the radio transceiver 210 may have to expend significant amounts of battery power to transmit the uplink signals at sufficiently high power levels to ensure that the base station can successfully receive and process the uplink signals.

Note that, in typical implementations, the wireless DL signals received by the radio transceiver 210 from the base station do not explicitly identify themselves as periodic DL signals from a periodic app or aperiodic DL signals from an aperiodic app. Instead, the processor 220 determines that the DL signals are periodic or aperiodic based on the timing of the arrival of those DL signals.

For example, for a typical periodic app, such as telephony or videoconferencing, the base station transmits—and the radio transceiver 210 receives—wireless periodic DL signals at regular time intervals, e.g., a 1-msec signal burst every 20 msec, where that 1-msec signal burst represents compressed data corresponding to 20 msec of rendered audio and/or video. After the radio transceiver 210 receives a 1-msec signal burst and the processor 220 stores corresponding periodic DL data in the periodic DL buffer 232, the processor 220 processes the periodic DL data stored in the periodic DL buffer 232 to recover and render 20 msec of audio and/or video using the device's speaker and/or display (not shown in FIG. 3) until the next 1-msec signal burst arrives. In this way, the wireless device 200 is able to render a continuous stream of audio and/or video to the user.

Over time, the processor 220 will detect the arrival of DL signal bursts separated by 20 msec, identify those DL signals as periodic DL signals, and store the corresponding DL data in the periodic DL buffer 232. Furthermore, the processor 220 will identify DL signals that arrive at other times, i.e., not corresponding to regular time intervals, as being aperiodic DL signals and will store the corresponding DL data in the aperiodic DL buffer 236 to be subsequently retrieved and processed.

Note that, for uplink data, the processor 220 will know that (i) uplink data that the processor generates when executing a periodic app is periodic UL data to be stored in the periodic UL buffer 234 and (ii) uplink data that the processor generates when executing an aperiodic app is aperiodic UL data to be stored in the aperiodic UL buffer 238.

In general, in order to meet the more-stringent timing requirements for periodic apps, the processing of periodic DL/UL data may take precedence over the processing of aperiodic DL/UL data as long as there is no risk of losing any of the aperiodic DL/UL data. In many aperiodic apps, such as file transfer, data loss must be avoided. On the other hand, in some periodic apps involving audio and/or video data, data loss is less of a problem, because the human brain can accommodate for small amounts of lost audio and video content.

Figure 3:
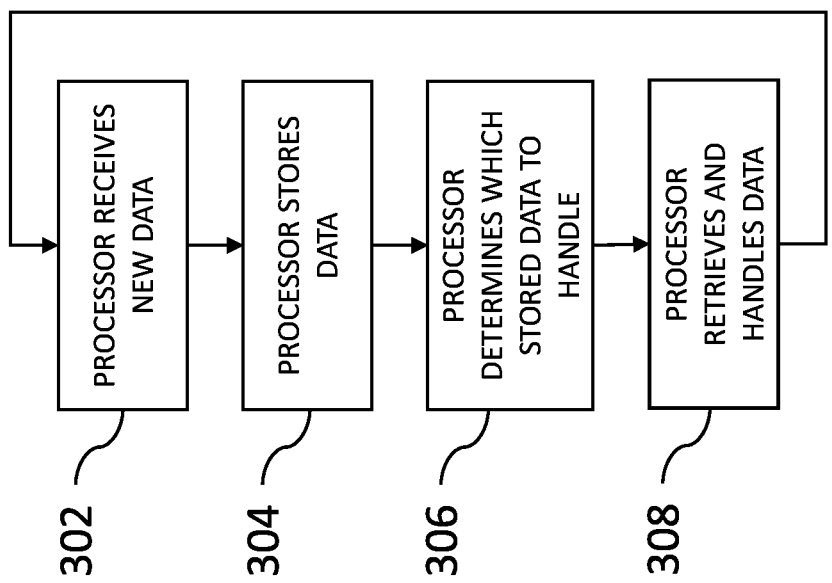
FIG. 3 is a flow diagram of the processing performed by the processor of FIG. 2 to coordinate the processing of periodic and aperiodic downlink and uplink data, according to certain embodiments of the disclosure.

FIG. 3 is a flow diagram of the processing performed by the processor 220 of FIG. 2 to coordinate the storage and retrieval of periodic and aperiodic downlink and uplink data into and from the periodic and aperiodic downlink and uplink buffers 232-238, according to certain embodiments of the disclosure. For this discussion, the data is assumed to be packetized data. Those skilled in the art will understand that the disclosure can be implemented for other types of data formatting.

In Step 302 of FIG. 3, the processor 220 receives one or more packets of new data, which could include one or more packets of periodic and/or aperiodic downlink data from the radio transceiver 210 and/or one or more packets of periodic and/or aperiodic uplink data from one or more apps executed by the processor 220.

In Step 304, the processor 220 stores the new data in one or more of buffers 232-238 as appropriate. In particular, for downlink data, the processor 220 determines whether a packet of new DL data is part of a stream of packetized DL data that arrives at regular time intervals. If so, then the processor 220 stores that packet into the periodic DL buffer 232. Otherwise, the processor 220 stores that packet into the aperiodic DL buffer 236.

Note that, when the processor 220 starts receiving periodic DL data, it may take some time before the processor 220 can detect the pattern of that data arriving at regular time intervals. In some implementations, the processor 220 tracks the start times of arriving DL signal bursts and analyzes those start times to detect whether those DL signal bursts arrive at regular time intervals. Note that, in general, DL data may include periodic DL data interspersed with aperiodic DL data such that zero, one, or more bursts of aperiodic DL data may arrive between each pair of successive bursts of periodic DL data. The processor 220 is configured to be able to detect the bursts of periodic DL data in that combined periodic/aperiodic DL traffic.

In some implementations, until the processor 220 is able to detect the bursts of periodic DL data, the processor 220 stores all DL data in the aperiodic DL buffer 236. When the processor 220 is finally able to detect bursts of periodic DL data, the processor 220 will then begin to store the detected periodic DL data in the periodic DL buffer 232, while continuing to store all other DL data in the aperiodic DL buffer 236. Note that, in general, in any given time span, the DL data may include zero, one, or more different streams of periodic data and zero, one, or more different streams of aperiodic data.

On the other hand, since uplink data is generated by applications running on the processor 220, in some implementations, the processor 220 is configured to know whether new uplink data is periodic UL data generated by a periodic app or aperiodic UL data generated by an aperiodic app. As such, the processor 220 knows where to store uplink data without having to monitor the timing of uplink data to determine whether it is periodic or aperiodic. As such, the processor 220 is able to store periodic UL data in the periodic UL buffer 234 and aperiodic UL data in the aperiodic UL buffer 238 as soon as uplink data is generated.

At the end of Step 304, each of the four buffers 232-238 may store a (different) number of packets of data. In Step 306, the processor 220 determines which stored data to retrieve and process next. This processing is described further below. In Step 308, based on the determination of Step 306, the processor 220 retrieves and processes one or more packets of data from one or more of buffers 232-238, where DL data is processed by the processor 220 for internal consumption and UL data is forwarded to the radio transceiver 210 for conversion and wireless transmission to the base station. Depending on the type of DL data, internal consumption may involve the decoding and rendering of voice and/or video data.

Following Step 308, processing returns to Step 302 to await the arrival of new data.

Those skilled in the art will understand that, in certain implementations, the processor 220 may perform interrupt-based processing in which different operations are interleaved in time. As a result, the processing shown in FIG. 3 is not necessarily performed in the sequence shown in FIG. 3. For example, Steps 302 and 304 may be part of a first processing thread, while Steps 306 and 308 may be part of a second processing thread, where the two threads may be implemented in an interleaved, interrupt-based manner rather than strictly sequentially. For example, the second thread may be a default thread that is continuously executed unless interrupted by the first thread upon the arrival of new data in Step 302. After the new data is stored in Step 304, the first thread is ended, and the second thread is resumed to retrieve and process data that is currently stored in the four buffers 232-238 in Steps 306 and 308.

In some implementations, the second thread of Steps 306 and 308 is itself implemented by the processor 220 using at least three different, interrupt-based processing sub-threads: a first sub-thread for aperiodic data, a second sub-thread for periodic data, and a third sub-thread for low-battery operations.

For the first sub-thread, the processor 220 may implement the following pseudocode for aperiodic data:

```
While ((Aperiodic UL Buffer Size − Aperiodic DL Buffer Size) > M) {
    Transmit Aperiodic UL Data
}
Else {
    Process Aperiodic DL Data
    Transmit Aperiodic UL Data
}
```

In other words, as long as the processor 220 determines that the amount of data in the aperiodic UL buffer 238 is greater than the amount of data in the aperiodic DL buffer 236 by at least a specified, configurable number of packets (M), the processor 220 will transmit aperiodic UL data from buffer 238 in Step 308. If and when the processor 220 determines that the amount of data in the aperiodic UL buffer 238 is no longer greater than the amount of data in the aperiodic DL buffer 236 by at least M, the processor 220 will begin to process (e.g., decode) aperiodic DL data in buffer 236 and, if and when all of that data is processed, the processor 220 will transmit aperiodic UL data in buffer 238. Note that, in some implementations, while the processor 220 is processing the aperiodic DL data, if the processor 220 determines that the "While" condition again becomes true, then the processor 220 will resume transmitting aperiodic UL data from buffer 238, possibly before all of the aperiodic DL data in buffer 236 has been processed.

For the second sub-thread, the processor 220 may implement the following pseudocode for periodic data:

```
While ((Periodic DL Buffer Size − Periodic UL Buffer Size) > N) {
    Process Periodic DL Data
}
Else {
    If (Battery Level > P) {
        Process Periodic DL Data
        Transmit Periodic UL Data
    {
}
```

In other words, as long as the processor 220 determines that the amount of data in the periodic DL buffer 232 is greater than the amount of data in the periodic UL buffer 234 by at least a specified, configurable number of packets (N), the processor 220 will process (e.g., decode) periodic DL data from buffer 232 in Step 308. If and when the processor 220 determines that the amount of data in the periodic DL buffer 232 is no longer greater than the amount of data in the periodic UL buffer 234 by at least N, the processor 220 will check to make sure that the battery level (i.e., the remaining battery power) is greater than some specified, configurable, power level (P) (e.g., 10% of maximum battery power). If so, then the processor 220 will process periodic DL data in buffer 232 and, if and when all of that data is processed, the processor 220 will transmit periodic UL data in buffer 234. If the processor 220 determines that the battery level is below P, then the processor 220 will not process any periodic data, in order to preserve the remaining battery life for other, more-important operations, such as processing aperiodic data. Note that, in some implementations, while the processor 220 is transmitting periodic UL data, if the processor 220 determines that the "While" condition again becomes true, then the processor 220 will resume processing periodic DL data in buffer 232, possibly before all of the periodic UL data in buffer 234 has been transmitted.

For the third sub-thread, the processor 220 may implement the following pseudocode for both periodic and aperiodic data based on current power levels:

```
If (Battery Level < Q) {
    If (Power Headroom < R) {
        Transmit Periodic UL Data
        Process Periodic DL Data
    }
    If ((Periodic DL Buffer Size = 0) and (Periodic UL Buffer Size = 0)) {
        Process Aperiodic DL Data
        Transmit Aperiodic UL Data
    }
}
```

The third sub-thread is provided for the processor 220 to handle situations when the battery power is low. If the processor 220 determines that the battery power is not low (i.e., if the battery level is not less than some specified, configurable, power level (Q, which may be the same as or different from P), then the third sub-thread is ended without the processor 220 processing any of the data in any of the buffers 232-238. Instead, in that case, the processing of the data in the buffers 232-238 is handled by the processor 220 implementing the first and second sub-threads as described above.

If, however, the processor 220 determines that the battery power is low, then the processor 220 compares the power headroom to a specified, configurable headroom level (R). The wireless device 200 is designed to transmit wireless UL signals at a dynamically determined power level that is sufficient to enable the base station to successfully receive and process the UL signals, but not much higher than that level in order to avoid wasting battery power. The power headroom is a measure of the difference between the device's maximum transmission power level and the device's current transmission power level.

When the wireless device 200 is near the base station, the wireless device 200 will transmit at a relatively low power level, and the power headroom will be relatively high. When the wireless device 200 is far from the base station, e.g., at or near the edge of the base station's coverage area, the wireless device 200 will transmit at a relatively high power level, and the power headroom will be relatively low.

If the processor 220 determines that the power headroom is less than R, then that is an indication that the wireless device 200 is near the edge of the base station's coverage area. As such, the wireless device 200 may soon be leaving that coverage area. As such, the priority is to handle the data currently stored in the periodic UL and DL buffers before handling the data currently stored in the aperiodic UL and DL buffers. In particular, if the power headroom is less than R, then the processor 220 transmits periodic UL data from buffer 234 and then processes periodic DL data in buffer 232. Otherwise, if the power headroom is not less than R, then the processor 220 does not handle any periodic data in this third sub-thread. In either case, if the processor 220 determines that both the periodic DL buffer 232 and the periodic UL buffer 234 are empty, then the processor 220 will process any aperiodic DL data in buffer 236 and then transmit any aperiodic UL data in buffer 238.

Note that the disclosure can be implemented for wireless devices having a single wireless transceiver capable of communicating with the base stations of one service provider as well as wireless devices, such as Dual-SIM, Dual-Subscription (DSDS) devices, having two wireless transceivers, each capable of communicating with the base stations of a different service provider.

In some implementations, threads are time interleaved when each thread is executed in a pooling fashion. For example, if the processor 220 has 3 seconds of processing time and there are three threads, then each thread is executed for 1 second in a round-robin manner.

In certain embodiments, the present disclosure is a wireless device comprising a transceiver, a processor, and a memory, wherein the processor is configured to store periodic downlink (DL) data received from the transceiver in a periodic DL buffer in the memory; store aperiodic DL data received from the transceiver in an aperiodic DL buffer in the memory; store periodic uplink (UL) data in a periodic UL buffer in the memory; store aperiodic UL data in an aperiodic UL buffer in the memory; determine in what order to handle the stored data in the periodic and aperiodic DL and UL buffers; and handle the stored data in the determined order.

In at least some of the above embodiments, the processor is configured to handle stored DL data by (i) retrieving the stored DL data from the corresponding DL buffer and (ii) processing the retrieved DL data; and handle stored UL data by (i) retrieving the stored UL data from the corresponding UL buffer and (ii) forwarding the retrieved UL data to the transceiver for wireless transmission of corresponding UL signals.

In at least some of the above embodiments, the processor compares buffer fullness of the periodic DL buffer to buffer fullness of the periodic UL buffer to determine in what order to handle stored periodic DL and UL data.

In at least some of the above embodiments, the processor determines that the buffer fullness of the periodic DL buffer is greater than the buffer fullness of the periodic UL buffer by at least a specified amount of data, the processor is configured to process stored periodic DL data in the periodic DL buffer.

In at least some of the above embodiments, if the processor determines that the buffer fullness of the periodic DL buffer is not greater than the buffer fullness of the periodic UL buffer by at least the specified amount of data, then the processor is configured to determine whether battery level is above a specified level.

In at least some of the above embodiments, if the processor determines that the battery level is above the specified level, then the processor is configured to process stored periodic DL data in the periodic DL buffer and then transmit stored periodic UL data in the periodic UL buffer.

In at least some of the above embodiments, the processor compares buffer fullness of the aperiodic DL buffer to buffer fullness of the aperiodic UL buffer to determine in what order to handle stored aperiodic DL and UL data.

In at least some of the above embodiments, while the processor determines that the buffer fullness of the aperiodic UL buffer is greater than the buffer fullness of the aperiodic DL buffer by at least a specified amount of data, then the processor is configured to transmit stored aperiodic UL data in the aperiodic UL buffer.

In at least some of the above embodiments, otherwise, the processor is configured to process periodic DL data in the periodic DL buffer and then transmit periodic UL data in the periodic UL buffer.

In at least some of the above embodiments, the processor implements a first processing thread to store data in the periodic and/or aperiodic DL and/or UL buffers; and a second processing thread to handle the stored data, wherein the first and second processing threads are implemented in an interrupt-based manner.

In at least some of the above embodiments, the second processing thread is a default thread that is configured to be interrupted by the first processing thread when new data is available.

In at least some of the above embodiments, the second processing thread comprises a first processing sub-thread for aperiodic DL and UL data; a second processing sub-thread for periodic DL and UL data; and a third processing sub-thread for low battery power operations.

In at least some of the above embodiments, in the third processing sub-thread, if the processor determines that there is insufficient battery power, then the processor is configured to determine how to handle the stored data based on power headroom of the device.

In at least some of the above embodiments, if the processor determines that the power headroom is less than a specified threshold level, then the processor is configured to transmit periodic UL data in the periodic UL buffer and then process periodic DL data in the periodic DL buffer before processing aperiodic DL data in the aperiodic DL buffer and transmitting aperiodic UL data in the aperiodic UL buffer.

In at least some of the above embodiments, the device is a DSDS phone.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A wireless device comprising a transceiver; a processor; and a memory, wherein the processor is configured to:
   store periodic downlink (DL) data received from the transceiver in a periodic DL buffer in the memory;
   store aperiodic DL data received from the transceiver in an aperiodic DL buffer in the memory;
   store periodic uplink (UL) data in a periodic UL buffer in the memory;
   store aperiodic UL data in an aperiodic UL buffer in the memory;
   determine in what order to handle the stored data in the periodic and aperiodic DL and UL buffers; and
   handle the stored data in the determined order, wherein:
   at least one place in the determined order is assigned to data selected from among the data stored in the periodic DL buffer, the aperiodic DL buffer, the periodic UL buffer, and the aperiodic UL buffer; and
   to determine what order to handle the stored data in the periodic and aperiodic DL and UL buffers, the processor:
   compares buffer fullness of the periodic DL buffer to buffer fullness of the periodic UL buffer or
   compares buffer fullness of the aperiodic DL buffer to buffer fullness of the aperiodic UL buffer.

2. The device of claim 1, wherein the processor is configured to:
   handle stored DL data by (i) retrieving the stored DL data from the corresponding DL buffer and (ii) processing the retrieved DL data; and
   handle stored UL data by (i) retrieving the stored UL data from the corresponding UL buffer and (ii) forwarding the retrieved UL data to the transceiver for wireless transmission of corresponding UL signals.

3. The device of claim 1, wherein the processor compares buffer fullness of the periodic DL buffer to buffer fullness of the periodic UL buffer to determine in what order to handle stored periodic DL and UL data.

4. The device of claim 3, wherein, in response to the processor determining that the buffer fullness of the periodic DL buffer is greater than the buffer fullness of the periodic UL buffer by at least a specified non-zero amount of data, the processor is configured to process stored periodic DL data in the periodic DL buffer.

5. The device of claim 4, wherein, in response to the processor determining that the buffer fullness of the periodic DL buffer is not greater than the buffer fullness of the periodic UL buffer by at least the specified non-zero amount of data, the processor is configured to determine whether battery level is above a specified level.

6. The device of claim 5, wherein, in response to the processor determining that the battery level is above the specified level, the processor is configured to process stored periodic DL data in the periodic DL buffer and then transmit stored periodic UL data in the periodic UL buffer.

7. The device of claim 1, wherein the processor compares buffer fullness of the aperiodic DL buffer to buffer fullness of the aperiodic UL buffer to determine in what order to handle stored aperiodic DL and UL data.

8. The device of claim 7, wherein, in response to the processor determining that the buffer fullness of the aperiodic UL buffer is greater than the buffer fullness of the aperiodic DL buffer by at least a specified non-zero amount of data, the processor is configured to transmit stored aperiodic UL data in the aperiodic UL buffer.

9. The device of claim 8, wherein, otherwise, the processor is configured to process periodic DL data in the periodic DL buffer and then transmit periodic UL data in the periodic UL buffer.

10. The device of claim 1, wherein the processor implements:
    a first processing thread to store data in the periodic and/or aperiodic DL and/or UL buffers; and
    a second processing thread to handle the stored data, wherein the first and second processing threads are implemented in an interrupt-based manner.

11. The device of claim 10, wherein the second processing thread is a default thread that is configured to be interrupted by the first processing thread in response to new data being available.

12. The device of claim 10, wherein the second processing thread comprises:

a first processing sub-thread for aperiodic DL and UL data;
a second processing sub-thread for periodic DL and UL data; and
a third processing sub-thread for operations in response to the processor determining that the wireless device's battery power is below a specified threshold level.

13. The device of claim 12, wherein, in the third processing sub-thread, in response to the processor determining that the battery power is below the specified threshold level, the processor is configured to determine how to handle the stored data based on power headroom of the device.

14. The device of claim 13, wherein, in response to the processor determining that the power headroom is less than a specified threshold level, the processor is configured to transmit periodic UL data in the periodic UL buffer and then process periodic DL data in the periodic DL buffer before processing aperiodic DL data in the aperiodic DL buffer and transmitting aperiodic UL data in the aperiodic UL buffer.

15. The device of claim 1, wherein the device is a dual-SIM, dual-subscription (DSDS) phone.

16. A method for a wireless device comprising a transceiver, a processor, and a memory, the method comprising the processor:
storing periodic downlink (DL) data received from the transceiver in a periodic DL buffer in the memory;
storing aperiodic DL data received from the transceiver in an aperiodic DL buffer in the memory;
storing periodic uplink (UL) data in a periodic UL buffer in the memory;
storing aperiodic UL data in an aperiodic UL buffer in the memory;
determining in what order to handle the stored data in the periodic and aperiodic DL and UL buffers; and
handling the stored data in the determined order, wherein:
at least one place in the determined order is assigned to data selected from among the data stored in the periodic DL buffer, the aperiodic DL buffer, the periodic UL buffer, and the aperiodic UL buffer; and
the determining comprises:
comparing buffer fullness of the periodic DL buffer to buffer fullness of the periodic UL buffer or
comparing buffer fullness of the aperiodic DL buffer to buffer fullness of the aperiodic UL buffer.

17. The method of claim 16, wherein the processor compares buffer fullness of the periodic DL buffer to buffer fullness of the periodic UL buffer to determine in what order to handle stored periodic DL and UL data.

18. The method of claim 16, wherein the processor compares buffer fullness of the aperiodic DL buffer to buffer fullness of the aperiodic UL buffer to determine in what order to handle stored aperiodic DL and UL data.

19. The method of claim 16, wherein the processor implements:
a first processing thread to store data in the periodic and/or aperiodic DL and/or UL buffers; and
a second processing thread to handle the stored data, wherein the first and second processing threads are implemented in an interrupt-based manner.

20. The method of claim 19, wherein the second processing thread comprises:
a first processing sub-thread for aperiodic DL and UL data;
a second processing sub-thread for periodic DL and UL data; and
a third processing sub-thread for operations in response to the processor determining that the wireless device's battery power is below a specified threshold level.

21. A wireless device comprising a transceiver; a processor; and a memory, wherein the processor is configured to:
store periodic downlink (DL) data received from the transceiver in a periodic DL buffer in the memory;
store aperiodic DL data received from the transceiver in an aperiodic DL buffer in the memory;
store periodic uplink (UL) data in a periodic UL buffer in the memory;
store aperiodic UL data in an aperiodic UL buffer in the memory;
determine in what order to handle the stored data in the periodic and aperiodic DL and UL buffers; and
handle the stored data in the determined order, wherein:
the processor compares buffer fullness of the periodic DL buffer to buffer fullness of the periodic UL buffer to determine in what order to handle stored periodic DL and UL data; and
in response to the processor determining that the buffer fullness of the periodic DL buffer is greater than the buffer fullness of the periodic UL buffer by at least a specified non-zero amount of data, the processor is configured to process stored periodic DL data in the periodic DL buffer.

22. The device of claim 21, wherein, in response to the processor determining that the buffer fullness of the periodic DL buffer is not greater than the buffer fullness of the periodic UL buffer by at least the specified non-zero amount of data, the processor is configured to determine whether battery level is above a specified level.

23. The device of claim 22, wherein, in response to the processor determining that the battery level is above the specified level, the processor is configured to process stored periodic DL data in the periodic DL buffer and then transmit stored periodic UL data in the periodic UL buffer.

24. A wireless device comprising a transceiver; a processor; and a memory, wherein the processor is configured to:
store periodic downlink (DL) data received from the transceiver in a periodic DL buffer in the memory;
store aperiodic DL data received from the transceiver in an aperiodic DL buffer in the memory;
store periodic uplink (UL) data in a periodic UL buffer in the memory;
store aperiodic UL data in an aperiodic UL buffer in the memory;
determine in what order to handle the stored data in the periodic and aperiodic DL and UL buffers; and
handle the stored data in the determined order, wherein:
the processor compares buffer fullness of the aperiodic DL buffer to buffer fullness of the aperiodic UL buffer to determine in what order to handle stored aperiodic DL and UL data; and
in response to the processor determining that the buffer fullness of the aperiodic UL buffer is greater than the buffer fullness of the aperiodic DL buffer by at least a specified non-zero amount of data, the processor is configured to transmit stored aperiodic UL data in the aperiodic UL buffer.

25. The device of claim 24, wherein, otherwise, the processor is configured to process periodic DL data in the periodic DL buffer and then transmit periodic UL data in the periodic UL buffer.

26. A wireless device comprising a transceiver; a processor; and a memory, wherein the processor is configured to:

store periodic downlink (DL) data received from the transceiver in a periodic DL buffer in the memory;
store aperiodic DL data received from the transceiver in an aperiodic DL buffer in the memory;
store periodic uplink (UL) data in a periodic UL buffer in the memory;
store aperiodic UL data in an aperiodic UL buffer in the memory;
determine in what order to handle the stored data in the periodic and aperiodic DL and UL buffers; and
handle the stored data in the determined order, wherein the processor implements:
a first processing thread to store data in the periodic and/or aperiodic DL and/or UL buffers; and
a second processing thread to handle the stored data, wherein the first and second processing threads are implemented in an interrupt-based manner.

27. The device of claim 26, wherein the second processing thread is a default thread that is configured to be interrupted by the first processing thread in response to new data being available.

28. The device of claim 26, wherein the second processing thread comprises:
a first processing sub-thread for aperiodic DL and UL data;
a second processing sub-thread for periodic DL and UL data; and
a third processing sub-thread for operations in response to the processor determining that the wireless device's battery power is below a specified threshold level.

29. The device of claim 28, wherein, in the third processing sub-thread, in response to the processor determining that the battery power is below the specified threshold level, the processor is configured to determine how to handle the stored data based on power headroom of the device.

30. The device of claim 29, wherein, in response to the processor determining that the power headroom is less than a specified threshold level, the processor is configured to transmit periodic UL data in the periodic UL buffer and then process periodic DL data in the periodic DL buffer before processing aperiodic DL data in the aperiodic DL buffer and transmitting aperiodic UL data in the aperiodic UL buffer.

31. A method for a wireless device comprising a transceiver, a processor, and a memory, the method comprising the processor:
storing periodic downlink (DL) data received from the transceiver in a periodic DL buffer in the memory;
storing aperiodic DL data received from the transceiver in an aperiodic DL buffer in the memory;
storing periodic uplink (UL) data in a periodic UL buffer in the memory;
storing aperiodic UL data in an aperiodic UL buffer in the memory;
determining in what order to handle the stored data in the periodic and aperiodic DL and UL buffers; and
handling the stored data in the determined order, wherein the processor implements:
a first processing thread to store data in the periodic and/or aperiodic DL and/or UL buffers; and
a second processing thread to handle the stored data, wherein the first and second processing threads are implemented in an interrupt-based manner.

32. The method of claim 31, wherein the second processing thread comprises:
a first processing sub-thread for aperiodic DL and UL data;
a second processing sub-thread for periodic DL and UL data; and
a third processing sub-thread for operations in response to the processor determining that the wireless device's battery power is below a specified threshold level.

* * * * *